United States Patent
Luo

(10) Patent No.: US 10,486,882 B2
(45) Date of Patent: Nov. 26, 2019

(54) PRODUCTION METHOD FOR HEAT INSULATION BAG

(71) Applicant: Binghua Luo, Quanzhou (CN)

(72) Inventor: Binghua Luo, Quanzhou (CN)

(*) Notice: Subject to any disclaimer, the term of this patent is extended or adjusted under 35 U.S.C. 154(b) by 323 days.

(21) Appl. No.: 15/549,836

(22) PCT Filed: Dec. 14, 2016

(86) PCT No.: PCT/CN2016/000681
§ 371 (c)(1),
(2) Date: Aug. 9, 2017

(87) PCT Pub. No.: WO2018/023204
PCT Pub. Date: Feb. 8, 2018

(65) Prior Publication Data
US 2018/0229911 A1   Aug. 16, 2018

(30) Foreign Application Priority Data
Aug. 5, 2016   (CN) .......................... 2016 1 0638780

(51) Int. Cl.
*B29C 65/00* (2006.01)
*B29C 65/02* (2006.01)
(Continued)

(52) U.S. Cl.
CPC .......... *B65D 81/18* (2013.01); *B65D 77/0406* (2013.01); *B65D 81/3818* (2013.01);
(Continued)

(58) Field of Classification Search
CPC ......... A45C 11/20; A45C 13/103; F25D 3/08; F25D 2331/801; B29C 65/00;
(Continued)

(56) References Cited

U.S. PATENT DOCUMENTS 6,244,458 B1 * 6/2001 Frysinger ........... B65D 81/3823
220/592.09
9,139,352 B2   9/2015 Seiders et al.
(Continued)

FOREIGN PATENT DOCUMENTS

| CN | 2091283 U | 12/1991 |
|---|---|---|
| CN | 204605043 U | 9/2015 |

(Continued)

*Primary Examiner* — Philip C Tucker
*Assistant Examiner* — Brian R Slawski
(74) *Attorney, Agent, or Firm* — Maier & Maier, PLLC

(57) ABSTRACT

A production method for a heat insulation bag with a more regular shape and less heat transfer, the method includes preparing a bag cover, an inner bag and an outer bag; placing a heat insulation layer between the inner bag and the outer bag; and then welding the heat insulation layer, the inner bag and the outer bag together. Improvements of the present invention include the steps of first preparing an inner bag periphery before preparing the inner bag, then welding an inner bag top sheet, welding an inner bag enclosure, cutting off the middle portion of the inner bag top sheet, and then welding a bottom surface of the inner bag, thereby forming an inner bag platform in the inner bag. Thus, heat transfer between the bag cover and the bag body after the production of the heat insulation bag is reduced and the heat insulation effect is improved.

4 Claims, 5 Drawing Sheets

(51) Int. Cl.
*B29C 65/62* (2006.01)
*B29C 65/72* (2006.01)
*B29C 65/78* (2006.01)
*B65D 81/18* (2006.01)
*B65D 77/04* (2006.01)
*B65D 81/38* (2006.01)

(52) U.S. Cl.
CPC .......... *B65D 81/3823* (2013.01); *B29C 65/02* (2013.01); *B29C 65/62* (2013.01); *B29C 65/72* (2013.01); *B29C 65/782* (2013.01); *B29C 65/7855* (2013.01); *B29C 66/242* (2013.01); *B29C 66/4312* (2013.01); *B29C 66/4322* (2013.01); *B29C 66/71* (2013.01); *B65D 2581/055* (2013.01)

(58) Field of Classification Search
CPC ......... B29C 65/02; B29C 65/18; B29C 65/56; B29C 65/62; B29C 65/72; B29C 65/78; B29C 65/7802; B29C 65/782; B29C 65/7823; B29C 65/7841; B29C 65/7855; B29C 66/00; B29C 66/242; B29C 66/2424; B29C 66/24244; B29C 66/41; B29C 66/43; B29C 66/431; B29C 66/4312; B29C 66/432; B29C 66/4322; B29C 66/4324; B29C 66/4326; B29C 66/43421; B29C 66/71; B65D 81/18; B65D 81/3823; B65D 81/3897
USPC .. 156/60, 66, 69, 70, 73.1, 73.4, 91, 92, 93, 156/182, 196, 212, 214, 215, 217, 218, 156/250, 252, 256, 263, 267, 292, 293, 156/308.2, 308.4, 309.6; 383/97, 109, 383/110; 62/371, 457.7, 530; 220/592.2, 220/592.25, 915.1, 915.2; 206/545
See application file for complete search history.

(56) References Cited

U.S. PATENT DOCUMENTS

| | | | |
|---|---|---|---|
| 2003/0198408 A1* | 10/2003 | Mogil | A45C 7/0077 383/110 |
| 2012/0243808 A1* | 9/2012 | de Lesseux | B65D 81/3897 383/110 |
| 2016/0244239 A1* | 8/2016 | Nash | A45F 3/04 |
| 2017/0119116 A1* | 5/2017 | Bradley | A45C 7/004 |

FOREIGN PATENT DOCUMENTS

| | | |
|---|---|---|
| CN | 204776465 U | 11/2015 |
| JP | 2004-175368 A | 6/2004 |

* cited by examiner

PRODUCTION METHOD FOR HEAT INSULATION BAG

TECHNICAL FIELD

The present invention relates to a production method for a heat insulation bag which is used in the fields such as cold-chain logistics, product freshness preservation, heat insulation, constant temperature storage and so on.

BACKGROUND

Heat insulation bags are divided into two classes, i.e., rigid and flexible ones. A flexible heat insulation bag usually includes a bag body and a bag cover. The bag body includes an inner bag, an outer bag and a heat insulation layer. The inner bag is provided with an upper opening and a cavity having a certain volume. The outer bag is provided with an upper opening and a cavity bigger than the inner bag. The heat insulation layer is provided between the inner bag and the outer bag for heat insulation function between the inner bag and the outer bag. The heat insulation layer has a front sidewall, a rear sidewall, a left sidewall, a right sidewall and a lower sidewall connected integrally. The bag cover includes an upper cover, a lower cover and a heat insulation material layer. The outer sidewalls of the upper cover and the lower cover are fixedly connected. The heat insulation material layer of the bag cover is provided between the upper cover and the lower cover. The bag body and the bag cover are usually connected detachably by means of a zipper or a snap-fit device. Such flexible bags are divided into two classes, i.e., waterproof and non-waterproof ones. The constituent parts of a non-waterproof heat insulation bag are usually connected by means of sewing. The appearance of the entire heat insulation bag is relatively regular, and the production is convenient. Of course, the defect is that such a bag is non-waterproof. For a waterproof heat insulation bag, the constituent materials need to be welded with high frequency. Referring to FIG. 1, since a heat insulation layer 3' has a certain thickness, an outer bag 1' and an inner bag 2' of the bag body cannot be welded to the heat insulation layer with close adhesion but there is a certain distance L from the upper surface of the heat insulation layer. As such, when a bag cover 5' is placed on the bag body, since a zipper 4' and the portion of distance L cannot bear loads, the appearance of the entire heat insulation bag is irregular. And at the same time, since the portion of distance L has no heat insulation function, the heat exchange greatly increases at the zipper 4' and the portion of the distance L, thus the heat insulation effect is greatly restricted. Therefore, it is necessary to further optimize the heat insulation effect of the existing heat insulation bag. In addition, a heat insulation bag and a corresponding production method are disclosed in U.S. Pat. No. 9,139,352B2 published on Sep. 22, 2015. The production process of this heat insulation bag includes: cutting a sheet material and preparing an accessory, welding a bag cover (that is, welding the bag cover sheet material with a waterproof zipper together), welding an inner bag (welding various constituent sheet materials of the inner bag together), welding the bag cover and the inner bag together, welding an outer bag, preparing (installing) a heat insulation layer, placing the heat insulation layer into the outer bag, sleeving the inner bag into the inner side of the heat insulation layer, sewing the bag cover and the outer bag together, and finally obtaining a waterproof heat insulation bag. However, the bag cover of this waterproof heat insulation bag has no heat insulation layer, and thus the heat will easily exchange with the outside through the bag cover portion, producing poor heat insulation effect. Therefore, for a waterproof heat insulation bag in which both the bag body and the bag cover have heat insulation layers, how to reduce the heat exchange between detachable connection portions of the bag body and the bag cover is a urgent technical problem to be solved.

SUMMARY

The present invention provides a production method for a heat insulation bag with a more regular shape and less heat transfer.

In order to realize the above object, the present invention is implemented by means of the following technical solution: a production method for a heat insulation bag, comprising the steps of:

a, preparing a bag cover;
b, preparing an inner bag;
c, preparing an outer bag;
d, sleeving a heat insulation layer on the inner bag, placing the heat insulation layer and the inner bag as a whole in the outer bag, and then welding an upper edge of the inner bag and the outer bag together; and
e, shaping the bag cover and the upper edge of the outer bag by gluing, and then performing welding to obtain a heat insulation bag.

Step b includes:

b1, providing a zipper groove on a rectangular thermoplastic cloth along the lengthwise direction and then welding the two longitudinal edges thereof together to obtain an inner bag periphery, the inner bag periphery having an upper periphery edge plate located above the zipper groove and a lower periphery edge plate located below the zipper groove;

b2, passing the inner bag periphery through the inner side of a mold I with the lower periphery edge plate flipped outwards to the outer side of the mold I, and placing an inner bag top sheet above the lower periphery edge plate and welding them together;

b3, welding two longitudinal edges of another rectangular thermoplastic cloth together as an inner bag enclosure of the inner bag;

b4, passing an upper edge of the inner bag enclosure through the inner side of a mold II and flipping the same outwards to the outer side of the mold II, welding the inner bag top sheet of the product obtained in step b2 with the inner bag enclosure together with the lower periphery edge plate and the inner bag enclosure being respectively located on the same side of the inner bag top sheet;

b5, cutting off a part of the inner bag top sheet of the product obtained in step b4 which is covered by the inner bag enclosure; and b6, placing a thermoplastic cloth on a lower edge of the inner bag enclosure of the product obtained in step b5 and welding them together to obtain the inner bag.

As a further improvement, step a of the production method for a heat insulation bag includes:

a1, welding two longitudinal edges of a rectangular thermoplastic cloth together to form a bag cover enclosure of the bag cover;

a2, placing a thermoplastic cloth on one side of the bag cover enclosure and performing welding to complete a sleeve cover bottom;

a3, placing the bag cover enclosure of the product obtained in step a2 into a heat insulation material layer;

a4, placing another thermoplastic cloth above the heat insulation material layer and welding the same with the bag cover enclosure;

a5, fixing the product obtained in step a4 with a flat-plate shaped outer bag cover together; and a6, wrapping another thermoplastic cloth on an outer edge of the product obtained in step a5 to obtain the bag cover.

As a further improvement, step c of the production method for a heat insulation bag includes:

c1) cutting a rectangular thermoplastic cloth as the outer bag enclosure of the outer bag and punching a zipper groove thereon;

c2) sewing an outer bag accessory on a small thermoplastic cloth, then welding the small thermoplastic cloth on the outer bag enclosure, and at the same time respectively welding two zipper strips of a waterproof zipper on two sides of the zipper groove of the outer bag enclosure;

c3) welding two longitudinal edges of the outer bag enclosure together; and c4) shaping the bag bottom with a lower edge of the outer bag enclosure by gluing and welding them together.

Preferably, in step d of the production method for a heat insulation bag, during welding, the waterproof zipper is opened, the upper edge of the lower periphery edge plate and the inner side of the outer bag enclosure or the zipper strip located below the zipper groove of the outer bag enclosure are welded together, and the upper periphery side plate is entirely welded on the inner side of the outer bag enclosure or the zipper strip located above the zipper groove of the outer bag enclosure.

By means of the above technical solution, the beneficial effects of the present invention are as follows. The present invention fundamentally changes the customary production method for an inner bag. That is, an entire inner bag top sheet is first welded with the inner bag periphery and then welded with the inner bag enclosure, so that an inner bag platform docketing with the bag cover is formed among the inner bag periphery and the inner bag enclosure and the inner bag top sheet. After a heat insulation layer is inserted below the inner bag platform, the inner bag platform bears the pressure of the bag cover, which pressure appears as a pull force and an external force after the waterproof zipper is closed. Thus the appearance of the entire heat insulation bag is regular and rigid. More importantly, when the bag cover is placed on the bag body, the lower surface of the bag cover is jointed with the inner bag platform of the inner bag. As a result, the location where the heat exchange of the entire heat insulation bag is relatively high is a closed line. At the same time, since the bag cover and the bag body are closely enclosed together by means of the waterproof zipper, the heat exchange at the closed line is further reduced. Therefore, this heat insulation bag has very good heat insulation effect.

DETAILED DESCRIPTION

Hereinafter, the implementations of the present invention will be described in detail in combination with particular embodiments to fully understand and implement the process of how the present invention applies a technical means to solve technical problems and achieve the corresponding technical effects.

Referring to FIGS. 2 to 9, a production method for a heat insulation bag is disclosed according to an embodiment, the method comprising the steps of:

a, preparing a bag cover 1;

b, preparing an inner bag 2;

c, preparing an outer bag 3;

d, sleeving a heat insulation layer 5 on the inner bag 2, placing the heat insulation layer 5 and the inner bag 2 as a whole in the outer bag 3, and then welding an upper edge of the inner bag 2 and the outer bag 3 together; and e, shaping the bag cover 1 and the upper edge of the outer bag 3 by gluing, and then performing welding to obtain a heat insulation bag.

In the above steps, steps a, b and c may be performed simultaneously without order limitation.

Figure 1:
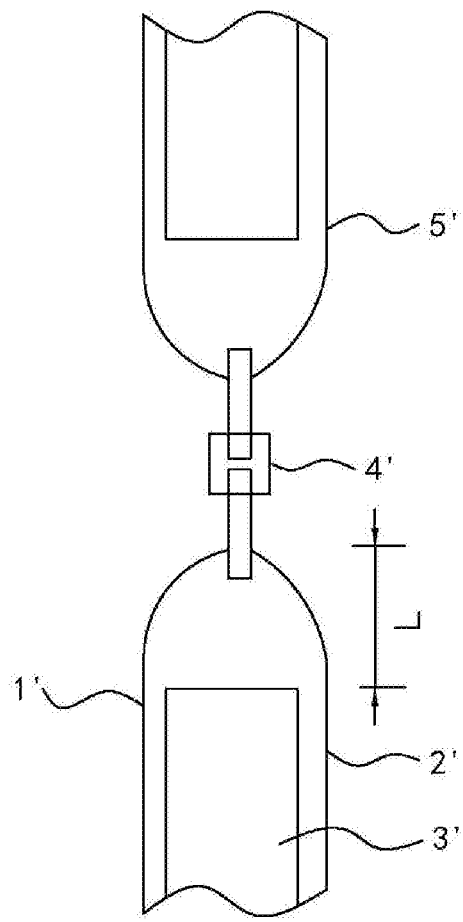
FIG. 1 is a schematic structure diagram of an engagement portion of a bag body and a bag cover of a well-known heat insulation bag.
Figure 2:
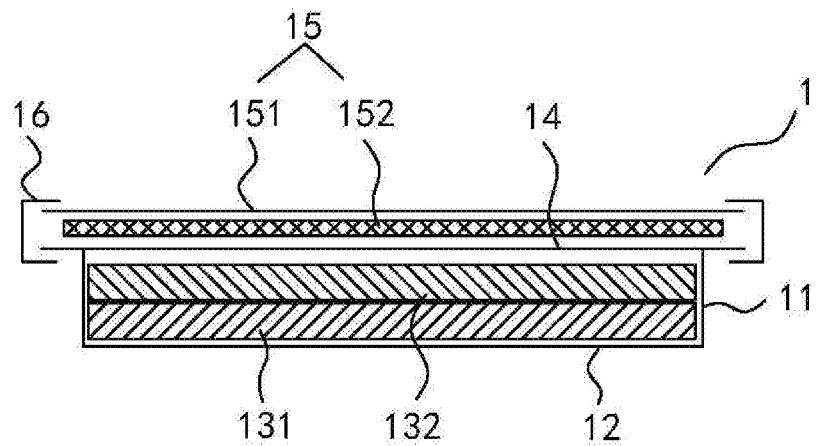
FIG. 2 is a schematic section view of a bag cover according to an embodiment of the present invention.

Referring to FIG. 2, step a includes:

a1, welding two longitudinal edges of a rectangular TPU cloth together as a bag cover enclosure 11 of the bag cover 1;

a2, placing a TPU cloth on the lateral side of the bag cover enclosure 11 and performing welding to complete a sleeve cover bottom 12;

a3, placing the bag cover enclosure 11 of the product obtained in step a2 into a heat insulation material layer 131 and a heat insulation material layer 132, the heat insulation material layer 131 and the heat insulation material layer 132 being heat insulation cotton with different heat insulation performances;

a4, placing another TPU cloth 14 above the heat insulation material layer 132 and performing welding with the bag cover enclosure 11 together;

a5, fixing the product obtained in step a4 and a flat-plate shaped outer bag cover 15 together, wherein an upper surface of the outer bag cover 15 is TPU cloth 151, a lower surface of the outer bag cover 15 is composited with a non-thermoplastic material layer 152 which is mainly used for ensuring the strength of the bag cover 1, and thus the fixation here is to fix the product obtained in step a4 to an outer edge of the outer bag cover 15 by means of sewing; and a6, wrapping another TPU cloth 16 on an outer edge of the product obtained in step a5 and performing welding to obtain the bag cover 1 so that the bag cover 1 has a waterproof function. Of course, in step a5, the product obtained in step a4 and the outer bag cover 15 may be fixed together by gluing. However, such a fixation manner will generate delamination over time. Although the binding procedure of a6 is omitted, the performance of the product is affected to some extent, which will be a deterioration of this invention. During actual production, when the bag cover is placed and closed above the inner bag, the height of the upper surface of the bag cover is slightly higher than that of the outer bag. As a result, when the bag cover is closed by means of a zipper, the lower surface of the bag cover and the upper edge of the inner bag are tightly closed with a small air contact area and the heat loss is suppressed to the greatest extent.

Figure 3:
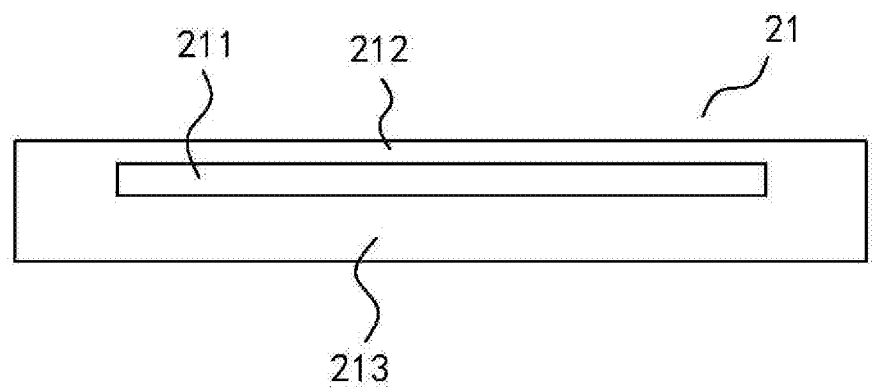
FIG. 3 is a schematic structure view of an inner bag periphery after unfolding according to an embodiment of the present invention.
Figure 4:
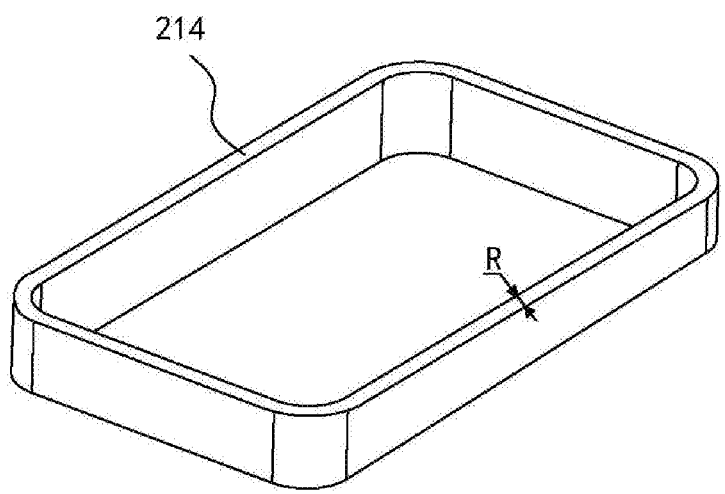
FIG. 4 is a schematic structure view of a mold 214 according to an embodiment of the present invention.
Figure 5:
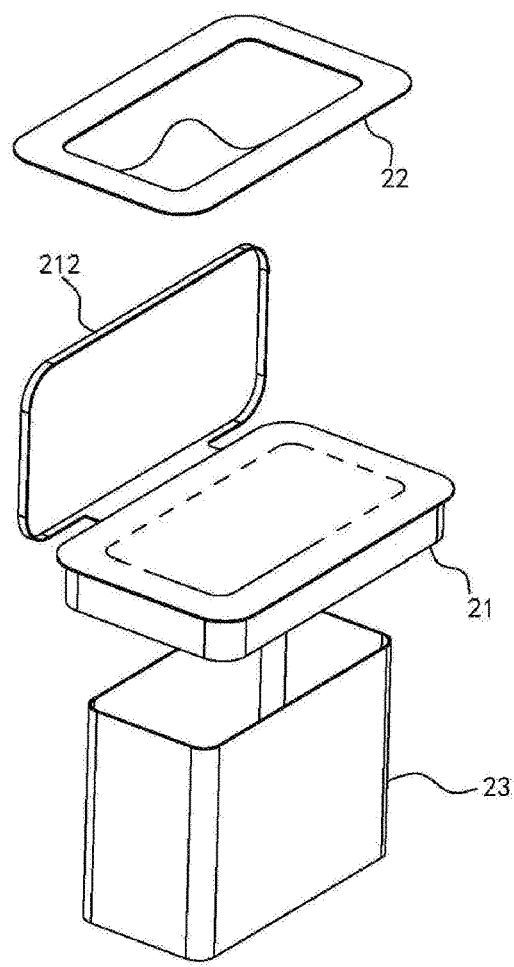
FIG. 5 is an schematic exploded view of an inner bag according to an embodiment of the present invention.
Figure 6:
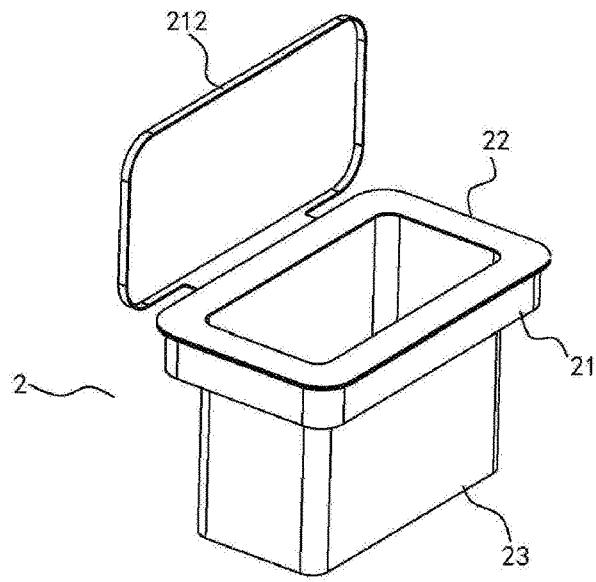
FIG. 6 is a perspective view of an inner bag according to an embodiment of the present invention.
Figure 7:
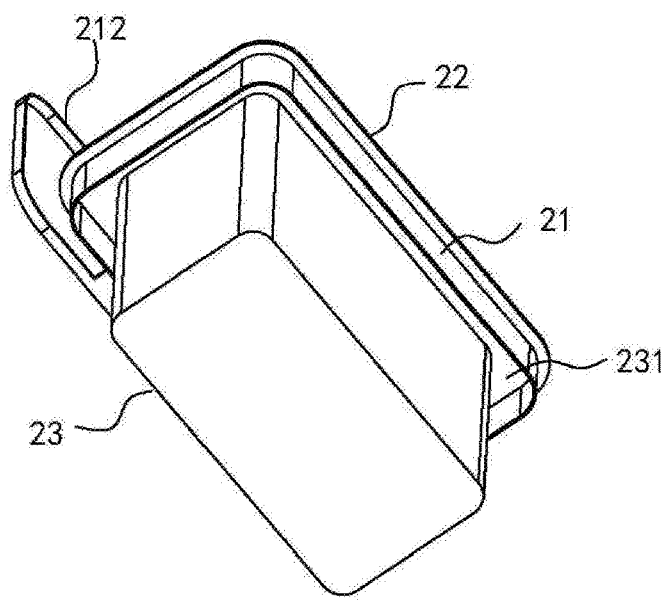
FIG. 7 is another perspective view of an inner bag according to an embodiment of the present invention.
Figure 8:
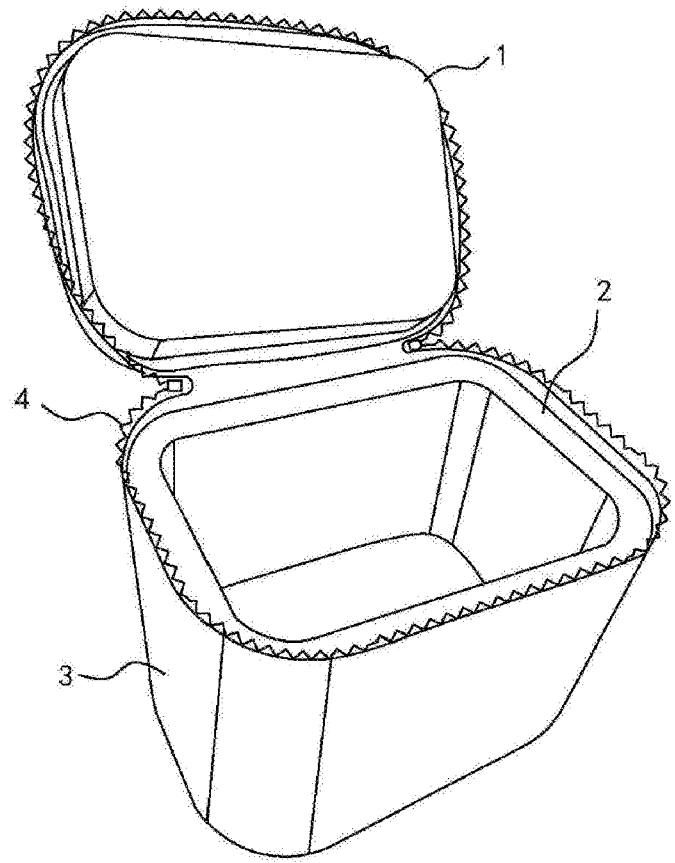
FIG. 8 is a perspective view of a heat insulation bag obtained according to an embodiment of the present invention.
Figure 9:
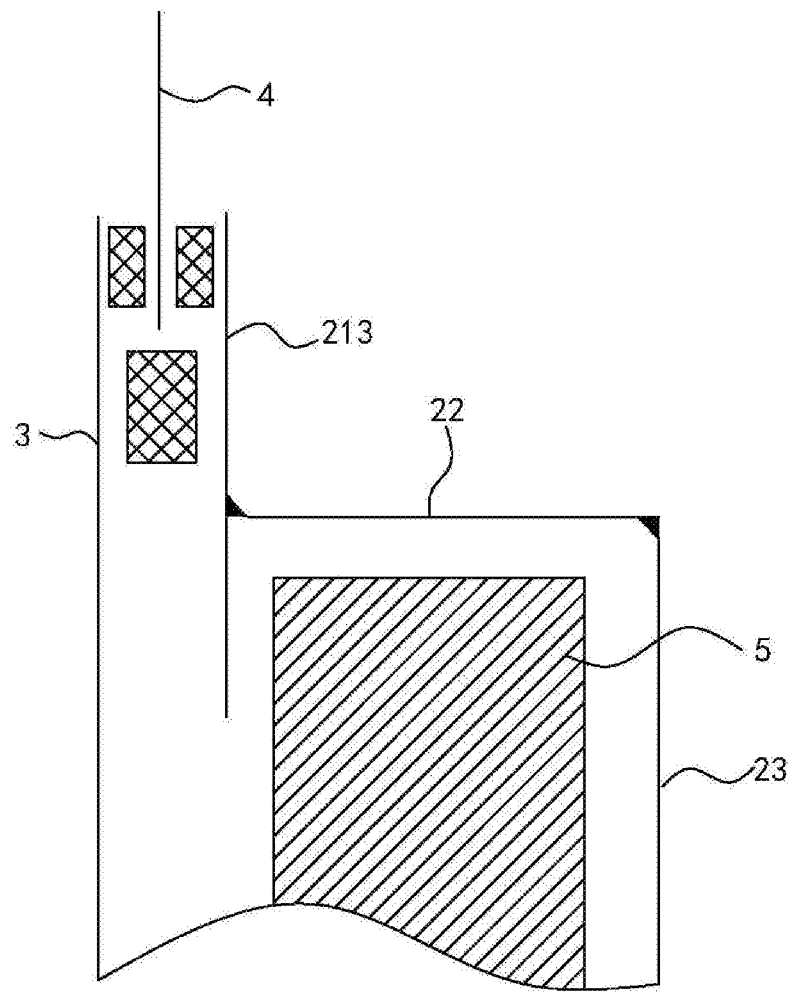
FIG. 9 is a schematic structure view of a welding structure of an outer bag and an inner bag according to an embodiment of the present invention.

Referring to FIGS. 3 to 7, step b includes:

b1, providing a zipper groove 211 on a rectangular thermoplastic cloth along the lengthwise direction and then welding the two longitudinal edges thereof together to obtain an inner bag periphery 21, the inner bag periphery 21 having an upper periphery edge plate 212 located above the zipper groove 211 and a lower periphery edge plate 213 located below the zipper groove 211 (referring to FIG. 3);

b2, passing the inner bag periphery 21 through the inner side of a mold 214 (referring to FIG. 4) with one side of the lower periphery edge plate 213 close to the zipper groove 211 flipped outwards to the outer side of the mold 214, and placing an inner bag top sheet 22 above the lower periphery edge plate 213 and welding them together, wherein the mold 214 is a hollow annular structure and the thickness R of the mold 214 is the welding thickness (referring to FIG. 5);

b3, welding two longitudinal edges of another TPU thermoplastic cloth together as the inner bag enclosure 23 of the inner bag (referring 5);

b4, passing an upper edge of the inner bag enclosure 23 through the inner side of a mold II and flipping the same outwards to the outer side of the mold II, welding the inner bag top sheet 22 of the product obtained in step b2 with the inner bag enclosure 23 together with the lower periphery edge plate 213 and the inner bag enclosure 23 being respectively located on the same side of the inner bag top sheet 22, wherein the structure of the mold II is similar to that of the mold 214 and the difference merely lies in that the circumferential length thereof is smaller than that of the mold 214; thus, a cavity 231 is formed between the lower periphery edge plate 213 and the inner bag enclosure 23, and the cavity 23 is used for installing the heat insulation layer 5 (referring to FIG. 7);

b5, cutting off a part of the inner bag top sheet 22 of the product obtained in step b4 which is wrapped by the inner bag enclosure 23 (the dashed portion in FIG. 5), the result being the structure shown in FIG. 6; and b6, placing a thermoplastic cloth on a lower edge of the inner bag enclosure 23 of the product obtained in step b5 and welding them together to obtain the inner bag 2.

Step c includes:

c1) cutting a rectangular TPU cloth as the outer bag enclosure of the outer bag and punching a zipper groove thereon;

c2) sewing an outer bag accessory on a small thermoplastic cloth, then welding the small thermoplastic cloth on the outer bag enclosure, and at the same time respectively welding two zipper strips of a waterproof zipper on the upper and lower sides of the zipper groove of the outer bag enclosure;

c3) welding two longitudinal edges of the outer bag enclosure together; and c4) shaping the bag bottom with a lower edge of the outer bag enclosure by gluing and welding them together.

A step of welding the small thermoplastic cloth is alternatively included after step c3 or step c4. The small thermoplastic cloth is sewn with various accessories of the heat insulation bag.

Steps c1 to c4 are well known.

Step d includes: sleeving the heat insulation layer 5 in the cavity 231 of the inner bag 2. In particular, an upper edge of the heat insulation layer 5 is embedded between the inner bag enclosure 23 and the inner bag periphery 21 below the inner bag top sheet 22 in a manner of interference fit. Then the heat insulation layer 5 and the inner bag 2 are entirely placed in the outer bag 3. Then the waterproof zipper 4 is opened. An upper edge of the lower periphery edge plate 213 is welded with the inner side of the outer bag enclosure and the zipper strip below the zipper groove of the outer bag enclosure. The upper periphery edge plate 212 is entirely welded on the inner side of the outer bag enclosure and the zipper strip above the zipper groove of the outer bag enclosure. In this embodiment, the lower periphery edge plate 213 is welded with the inner side of the outer bag enclosure and the zipper strip simultaneously in that the welded portion of the upper edge of the lower periphery edge plate 213 crosses the portion, which is below the zipper groove at the inner side of the outer bag enclosure, and is welded with the zipper strip. The upper periphery edge plate 212 is welded similarly.

In the technical solution of the present invention, the heat insulation layer 5 is made of a well-known polyurethane foaming sponge or EVA foaming material. When being used as the heat insulation layer between the inner bag 2 and the outer bag 3, the material source and the production method are both well-known technologies. Therefore, a step may be included even if no particular illustration of this step is made in the technical solution of the present invention. The thermoplastic cloth may be TPU or a composite cloth thereof, PVC and a composite material thereof.

In the description of the present invention, in the production method, the heat insulation bag includes various constituent portions, such as an outer bag, an inner bag, a bag cover, a heat insulation layer and a heat insulation material layer. However, when producing a complete heat insulation bag, the constituent portions are welded or fixed together. At this moment, the waterproof zipper forms a demarcation point of the constituent portions. Also, the heat insulation bag is formed by a bag body and a bag cover. The above slightly different two expressions are normal and will not introduce deviation or obstacle to the understanding of the technical solution.

Although the present invention is in particular presented and introduced in combination with preferred embodiments, those skilled in the art shall understand that various changes may be made to forms and details without departing from the spirit and scope of the present invention defined in the claims.

The invention claimed is:

1. A production method for a heat insulation bag, comprising the steps of:
   a) preparing a bag cover;
   b) preparing an inner bag;
   c) preparing an outer bag;
   d) sleeving a heat insulation layer on the inner bag, placing the heat insulation layer and the inner bag as a whole in the outer bag, and then welding an upper edge of the inner bag and an upper edge of the outer bag together; and e) shaping the bag cover and the upper edge of the outer bag by gluing, and then performing welding to obtain the heat insulation bag;

and further comprising:

b1) providing a zipper groove on a first rectangular thermoplastic cloth along a lengthwise direction and then welding two longitudinal edges thereof together to obtain an inner bag periphery, the inner bag periphery having an upper periphery edge plate located above the zipper groove and a lower periphery edge plate located below the zipper groove;

b2) passing the inner bag periphery through an inner side of a mold I with the lower periphery edge plate flipped outwards to an outer side of the mold I, and placing an inner bag top sheet above the lower periphery edge plate and welding the inner bag top sheet and the lower periphery edge plate together to create a first product;

b3) welding two longitudinal edges of a second rectangular thermoplastic cloth together as an inner bag enclosure of the inner bag;

b4) passing an upper edge of the inner bag enclosure through an inner side of a mold II and flipping the upper edge of the inner bag enclosure outwards to an outer side of the mold II, welding the inner bag top sheet of the first product with the inner bag enclosure together, with the lower periphery edge plate and the inner bag enclosure being respectively located on a same side of the inner bag top sheet to create a second product;

b5) cutting off a part of the inner bag top sheet of the second product which is covered by the inner bag enclosure to create a third product; and b6) placing a first thermoplastic cloth on a lower edge of the inner bag enclosure of the third product and welding the first thermoplastic cloth and the inner bag enclosure together to obtain the inner bag.

2. The production method for a heat insulation bag of claim 1, wherein step a) further comprises:

a1) welding two longitudinal edges of a third rectangular thermoplastic cloth together to form a bag cover enclosure of the bag cover;

a2) placing a second thermoplastic cloth on one side of the bag cover enclosure and performing welding to complete a sleeve cover bottom to create a fourth product;

a3) placing the bag cover enclosure of the fourth product into a heat insulation material layer;

a4) placing a third thermoplastic cloth above the heat insulation material layer and welding the third thermoplastic cloth with the bag cover enclosure to create a fifth product;

a5) fixing the fifth product with a flat-plate shaped outer bag cover together to create a sixth product; and a6) wrapping a fourth thermoplastic cloth on an outer edge of the sixth product to obtain the bag cover.

3. The production method for a heat insulation bag of claim 1, wherein step c) further comprises:

c1) cutting a fourth rectangular thermoplastic cloth as an outer bag enclosure of the outer bag and punching a zipper groove thereon;

c2) sewing an outer bag accessory on a small thermoplastic cloth, then welding the small thermoplastic cloth on the outer bag enclosure, and at the same time respectively welding two zipper strips of a waterproof zipper on two sides of the zipper groove of the outer bag enclosure, the two zipper strips comprising a zipper strip located below the zipper groove of the outer bag enclosure and a zipper strip located above the zipper groove of the outer bag enclosure;

c3) welding two longitudinal edges of the outer bag enclosure together; and c4) shaping a bag bottom with a lower edge of the outer bag enclosure by gluing and welding the bag bottom and the lower edge of the outer bag enclosure together.

4. The production method for a heat insulation bag of claim 3, wherein in step d), during welding, the waterproof zipper is opened, an upper edge of the lower periphery edge plate and an inner side of the outer bag enclosure or the zipper strip located below the zipper groove of the outer bag enclosure are welded together, and the upper periphery edge plate is entirely welded on the inner side of the outer bag enclosure or the zipper strip located above the zipper groove of the outer bag enclosure.

* * * * *